(No Model.) 5 Sheets—Sheet 1.
J. C. & C. H. TISE.
WATER ELEVATOR FOR WELLS.
No. 262,511. Patented Aug. 8, 1882.
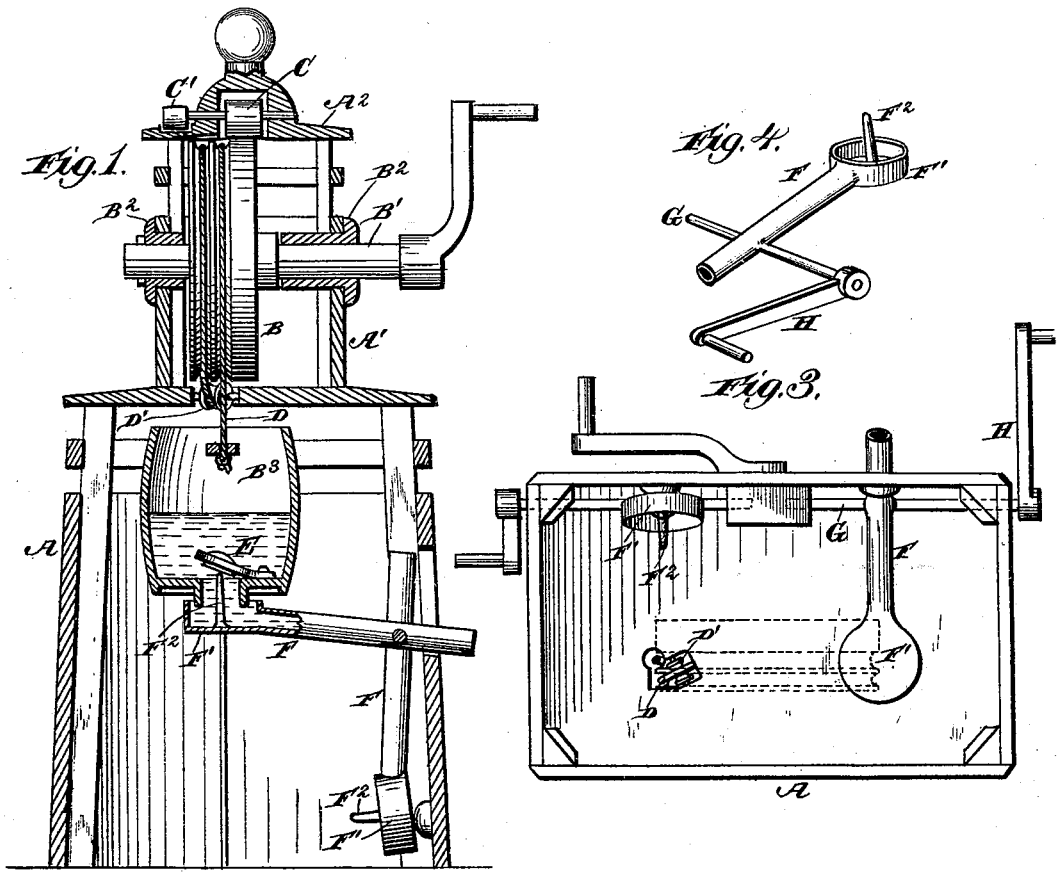
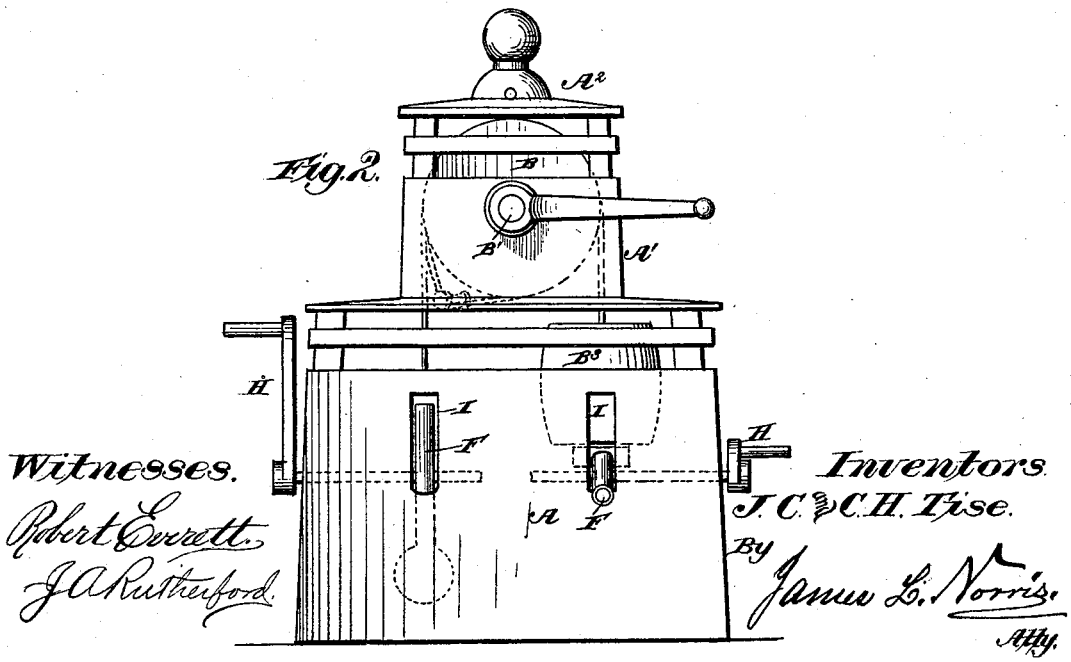
Witnesses.
Robert Everett.
J. A. Rutherford.
Inventors.
J. C. & C. H. Tise.
By James L. Norris.
Atty.

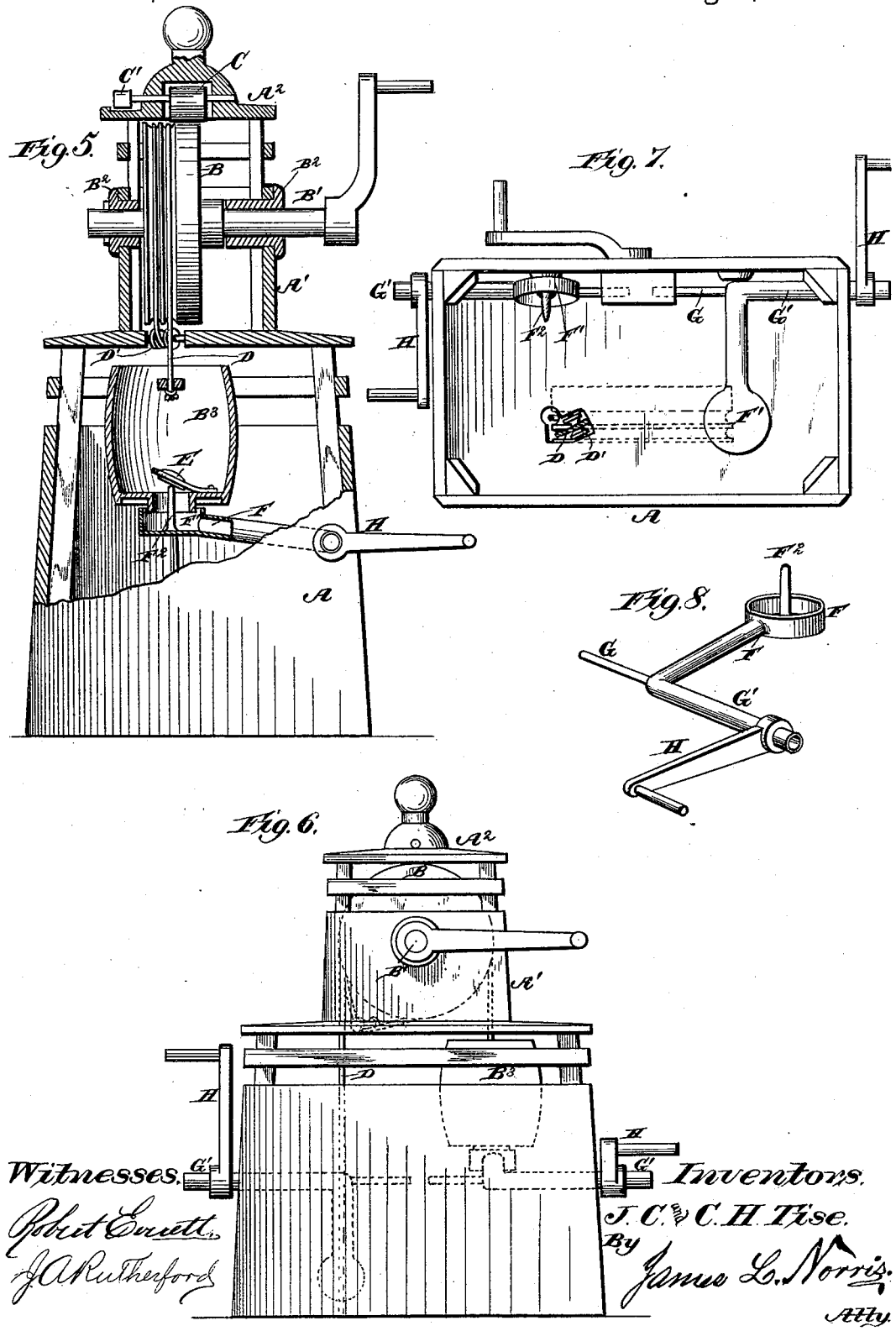

(No Model.)   J. C. & C. H. TISE.   5 Sheets—Sheet 3.
WATER ELEVATOR FOR WELLS.
No. 262,511.   Patented Aug. 8, 1882.
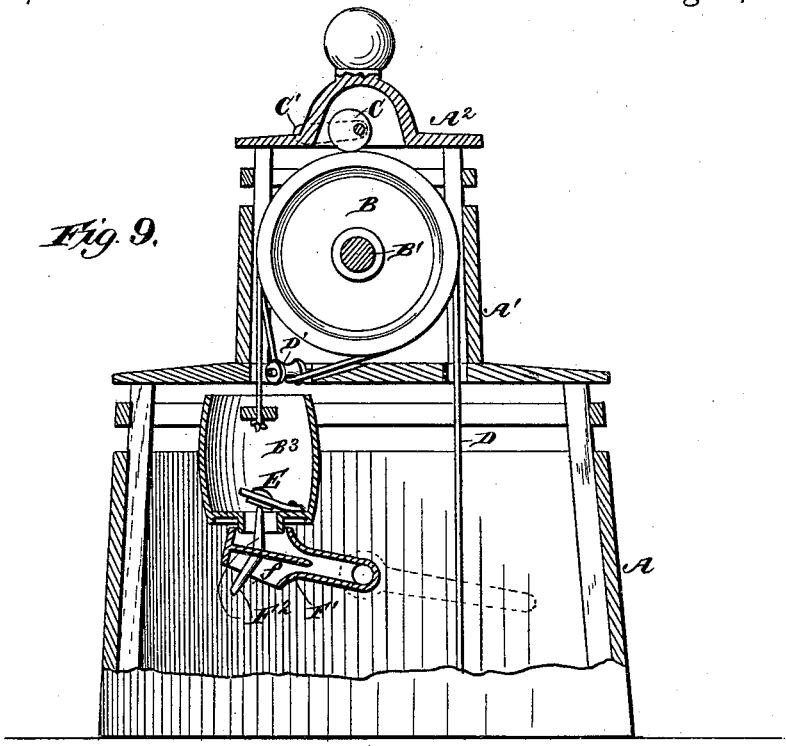
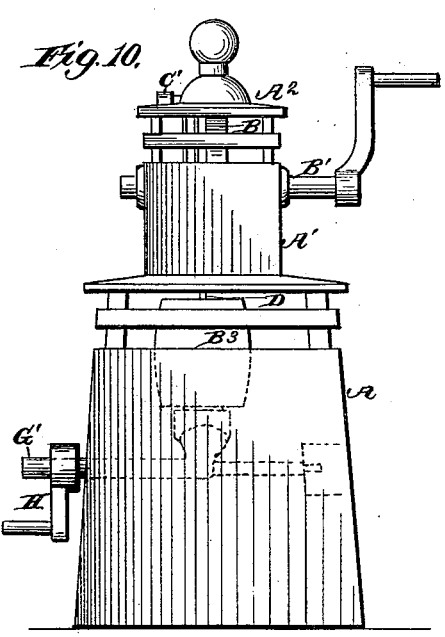
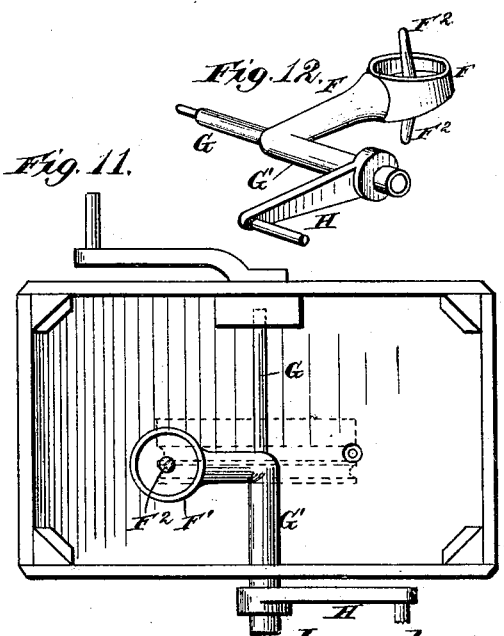
Witnesses:
Robert Everett
J. A. Rutherford
Inventors.
J. C. & C. H. Tise,
By James L. Norris, Atty.

(No Model.) 5 Sheets—Sheet 4.
J. C. & C. H. TISE.
WATER ELEVATOR FOR WELLS.
No. 262,511. Patented Aug. 8, 1882.
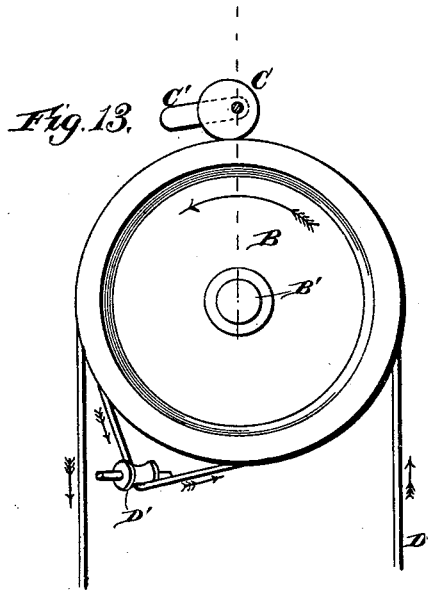
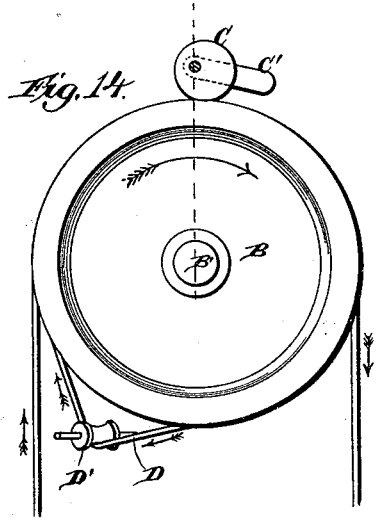
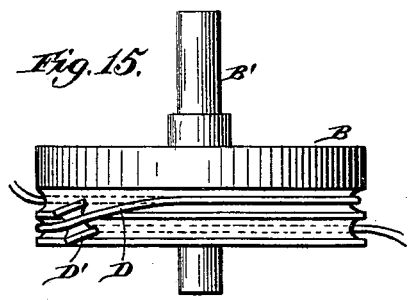
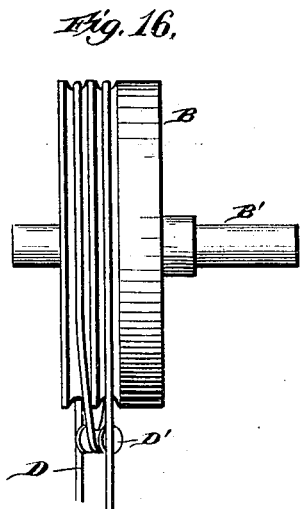
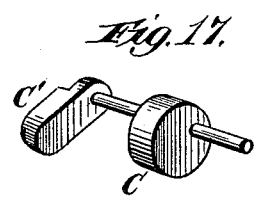
Witnesses.
Robert Everett
J. A. Rutherford
Inventors.
J. C. & C. H. Tise,
By James L. Norris.
Atty.

(No Model.)
J. C. & C. H. TISE.
WATER ELEVATOR FOR WELLS.
No. 262,511. Patented Aug. 8, 1882.
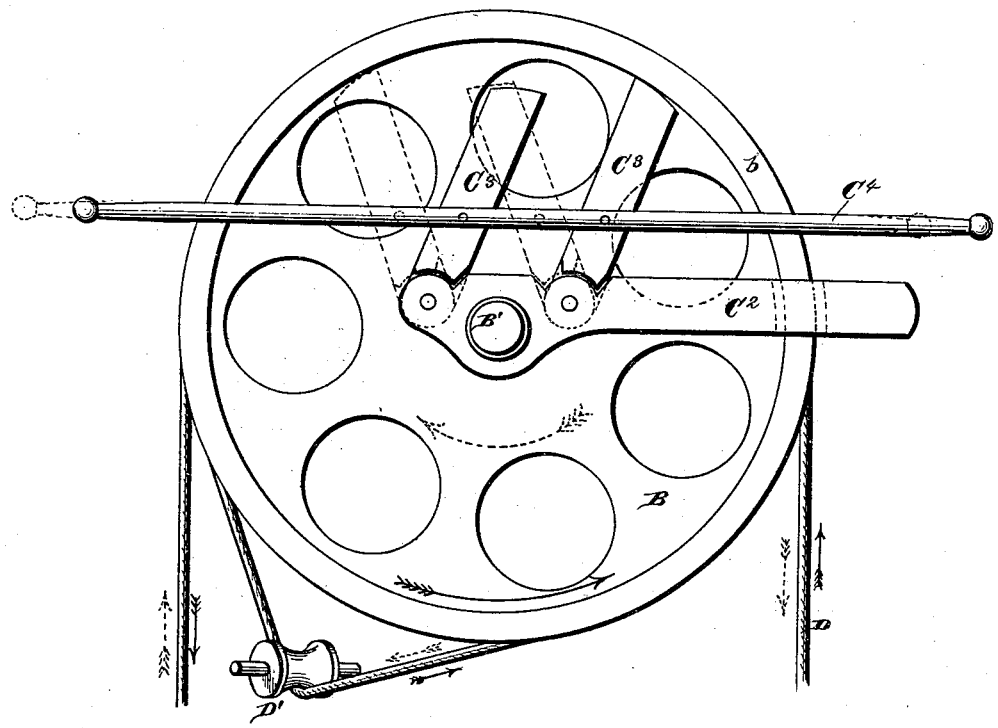
Fig. 18.
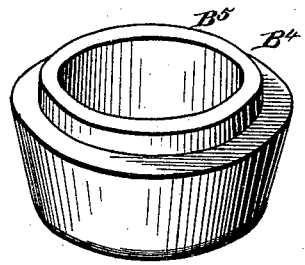
Fig. 19.
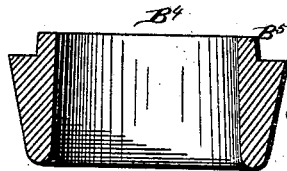
Witnesses,
Robert Everett,
J. A. Rutherford
Inventors,
J. C. & C. H. Tise.
By James L. Norris.
Atty.

UNITED STATES PATENT OFFICE.

JACOB C. TISE AND CHARLES H. TISE, OF WINSTON, NORTH CAROLINA.

WATER-ELEVATOR FOR WELLS.

SPECIFICATION forming part of Letters Patent No. 262,511, dated August 8, 1882.

Application filed June 1, 1882. (No model.)

*To all whom it may concern:*

Be it known that we, JACOB C. TISE and CHARLES H. TISE, citizens of the United States, residing at Winston, Forsyth county, North Carolina, have invented new and useful Improvements in Water-Elevators for Wells, of which the following is a specification.

This invention relates to that class of water-elevators for wells in which the bucket is provided with a discharge-opening and a valve in its bottom, and a swinging spout employed which can be tilted up so as to bring its receiving end under the bucket in position to open the valve and receive the water.

The objects of the invention are to provide an improved construction and arrangement of the windlass; also, to provide a novel construction of spout, whereby the water can be received and discharged in a more efficient manner than heretofore; also, to provide an improved brake or stop device for preventing the premature descent of a bucket; and, also, to provide certain improved details of construction. These objects are attained by means of the devices illustrated in the accompanying drawings, in which—

Figure 1 is a section taken on a vertical plane through our improved water-elevator. Fig. 2 is a side elevation; Fig. 3, a plan view of the under side; Fig. 4, a perspective view of the spout and its operating mechanism. Fig. 5 is a vertical section of the water-elevator with a variation in the construction of the rock-shaft; Fig. 6, a side elevation of the same; Fig. 7, a plan view of the under side, and Fig. 8 a perspective view of the spout and hollow shaft. Fig. 9 is a vertical section of the water-elevator with one spout adapted for two buckets. Fig. 10 is a side elevation; Fig. 11, a plan view of the under side, and Fig. 12, a perspective view of said spout and its hollow shaft. Fig. 13 shows the windlass-pulley with the brake or stop applied to check its motion in one direction; Fig. 14, a like view with the stop or brake applied to check its motion in the reverse direction. Figs. 15 and 16 are different views of the two pulleys. Fig. 17 shows the stop or brake. Fig. 18 shows another form of brake. Fig. 19 shows the sinker detached.

The letter A indicates the well-curb, and A' a suitable housing, which is mounted upon the top of the well-curb and provided with bearings for the axle of a windlass which is employed for raising or lowering the buckets. The windlass consists of a double-grooved hoisting-pulley, B, fixed upon an axle, B', which is provided with a crank-handle and supported in the collars $B^2$, that constitute bearings for the axle, and which are adapted to be turned in the housing when one portion of the collar becomes too much worn.

C indicates an automatic brake, which can be adjusted so as to check the rotation of the pulley in either direction. It consists of a wheel or roller eccentrically mounted upon a shaft, carrying at one end a weighted arm, C'. This shaft is journaled in the housing above the pulley, with the eccentric adjusted so as to rest upon the latter and the weighted arm fixed so as to normally rest upon the cover $A^2$ of the housing. It will be seen that when the pulley is rotated in one direction, as indicated by the arrow in Fig. 13, it will simply raise the eccentric and weighted arm, and that when reversely rotated it will bind against the eccentric and hold the weighted arm closely down upon the top $A^2$. It will also be seen that by swinging the weighted arm over to the other side the brake will operate in a reverse manner.

The pulley B is provided with two parallel annular grooves in its perimeter, and the rope D, which carries a bucket, $B^3$, at each end, or a weight at one end and a bucket at the other, passes around the pulley in its two grooves, and also passes once under a small grooved pulley, D', which is journaled in an opening in the top of the well-curb. This small pulley is employed for holding off from the main pulley that portion of the rope which spans the pulley between its two grooves. The rope passes around pulley B in one groove, then under the small pulley D', and then around the upper pulley in the remaining groove thereof. The bucket is provided in its bottom with a discharge-opening, which is closed by a valve, E, said valve being opened by means of the swinging spout F when it is desired to discharge the water. The tubular discharge-spout is mounted upon a rock-shaft, G, having its bearings in the well-curb and extended beyond the same, and upon the outer end of the spout-shaft is fixed a crank-handle, H, for turning the shaft, so as to swing the spout up to the bucket after the same has been brought into the elevated position shown in the drawings. The tube or spout is provided with a dish or cup shaped receiving end or chamber, F′, and it is adjusted upon its shaft so that after the bucket has been elevated it can be swung up so as to bring its enlarged or disk-shaped receiving end directly under the opening in the bucket, so that when the bucket-valve is open the water will flow directly into the receiving end of the spout, which latter is made tubular, so as to conduct off the water thus received. In order to open the bucket-valve when the spout is thus brought into position for receiving the water, I provide the receiving end of the spout with a stud or pin, $F^2$, which enters the opening in the bottom of the bucket, and, striking against the valve, lifts and holds the same open as long as the spout is maintained in such position, thereby allowing the water to flow from the barrel into the receiving end of the spout.

It will be obvious from the following that several modes of discharging the water from the spout could be employed, and also that either one spout can be employed for each bucket or that one spout can be employed for both buckets.

In Figs. 1, 2, and 3 each tubular spout is mounted upon a solid shaft and the discharge end of the spout projected through an opening, I, in the side of the well-curb, so that the trough, bucket, or other article for catching the water will be placed under the discharge end of the spout. In this way, by operating their respective handles, the spout-shafts can be turned and the spouts alternately raised and the filled buckets are brought to the top of the well-curb; but in Figs. 5 to 8, inclusive, the rock-shaft carrying the tubular spout is made hollow for a portion of its length, and the hollow portion G′ connected with the spout, so that the water from the latter will run into the spout, which passes through the side of the well-curb and conducts off the water. The handle is shown fixed upon the hollow portion of the shaft, and two hollow shafts are employed, one for each spout. The hollow portion of the shaft passes through the side of the well-curb and has its bearing therein, while any suitable bearing can be provided for the inner end of the shaft, which need not be made hollow.

In Figs. 9 to 12, inclusive, the hollow rock-shaft is employed in connection with the tubular spout for receiving the water therefrom and discharging it outside of the well-curb; but in said figures one spout only is provided for both buckets. This is effected by passing the spout-shaft transversely through the well-curb and forming the receiving end of the tubular spout with two inlets or receiving-chamber, F′, on opposite sides, the bottom $f$ of which constitutes a partition between the two chambers and extends a short distance down into the spout. The shaft is located midway between the bucket ropes or chains, so that after either bucket has been raised the spout can be swung up on either side to the same, and thus open the bucket-valve and receive the water. While a full bucket is being elevated, or after it has been raised, the stop or brake will prevent its descent until the weighted arm is swung to the other side, and then the bucket can be lowered and the next raised, the brake then operating to prevent the descent of the said bucket, as before.

In the brake shown in Fig. 18 an arm, $C^2$, is loosely mounted upon the axle of the double-grooved windlass pulley alongside of the latter, with its outer end projecting beyond the perimeter of the pulley, and an annular flange, $b$, around the periphery of the latter, will preferably be received in a notch in the arm, so that the arm will lie close to the pulley, and thus render the mechanism compact. The two brake-shoes or arms $C^3$ are pivoted to this arm $C^2$ at opposite sides of the pulley-axle, and have their ends beveled or curved to conform with the curvature of the inner face of the flange $b$ on the pulley. A bar, $C^4$, is pivoted to these two pivoted brake-shoes, and is adapted to operate the same. By moving the bar $C^4$ longitudinally in one direction the shoes will be turned upon their pivots and the end of one shoe brought against the flange $b$. By moving the bar $C^4$ in a reverse direction said shoe will be released from contact with the flange and the remaining brake-shoe will be brought to bear against the pulley-flange. Hence the brake can be made to act as a double brake for the purposes already stated in connection with the form of brake shown in Fig. 17. The arm $C^2$ will act as a stop by striking against any suitable check or abutment.

The sinker $B^4$ (shown best in Fig. 19) consists of a hollow metal casting, with a preferably tapering or inverted cone-shaped exterior, and having a top flange, $B^5$, which fits in an opening in the bottom of the bucket. This sinker is made sufficiently heavy to sink the bucket in the water and to maintain it in an upright position therein, and it is hollow, so that the water can pass through it.

In conclusion it may be mentioned that the spouts need not necessarily be made tubular, but can be made in the form of troughs semicircular in cross-section.

We do not herein claim the particular construction of braking mechanism illustrated in Fig. 18 of the drawings, as such will form the subject-matter of a separate application for Letters Patent.

What we claim is—

1. In a water-elevator for wells, the combination, with the buckets, of a windlass having a double-grooved pulley, B, and the small pulley located below said double-grooved pulley, whereby the bucket rope or chain can be passed under said small pulley so as to carry it from one groove to the other of the upper pulley, substantially as described.

2. The combination, in a water-elevator, of the windlass and buckets, each having a discharge-opening and a valve in its bottom, with a single swinging tubular discharge-spout having at its receiving end openings on opposite sides, and mounted upon a shaft so as to be brought under and upon the valve of either bucket, substantially as described.

3. The combination, in a water-elevator, of the windlass and the buckets, each having a valve and a discharge-opening in its bottom, with the tubular spout F, mounted upon a rock-shaft and having at its receiving end the two chambers F', separated by a partition, f, with studs F² on opposite sides, substantially as described.

4. The combination, in a water-elevator, of the windlass and buckets, each provided with a valve and a discharge-opening in its bottom, with the tubular spout F and the hollow rock-shaft G', connecting with said spout, substantially as described.

5. The combination, in a water-elevator, of the double-grooved pulley B with the lower small pulley, D', the rope passing around said pulleys as described, and a brake or stop mechanism for the upper double-grooved pulley, substantially as set forth.

In testimony whereof we have hereunto set our hands in the presence of two subscribing witnesses.

JACOB C. TISE.
CHARLES H. TISE.

Witnesses:
N. W. NADING,
S. K. CHAMBERLAIN.